United States Patent Office 2,885,187
Patented May 5, 1959

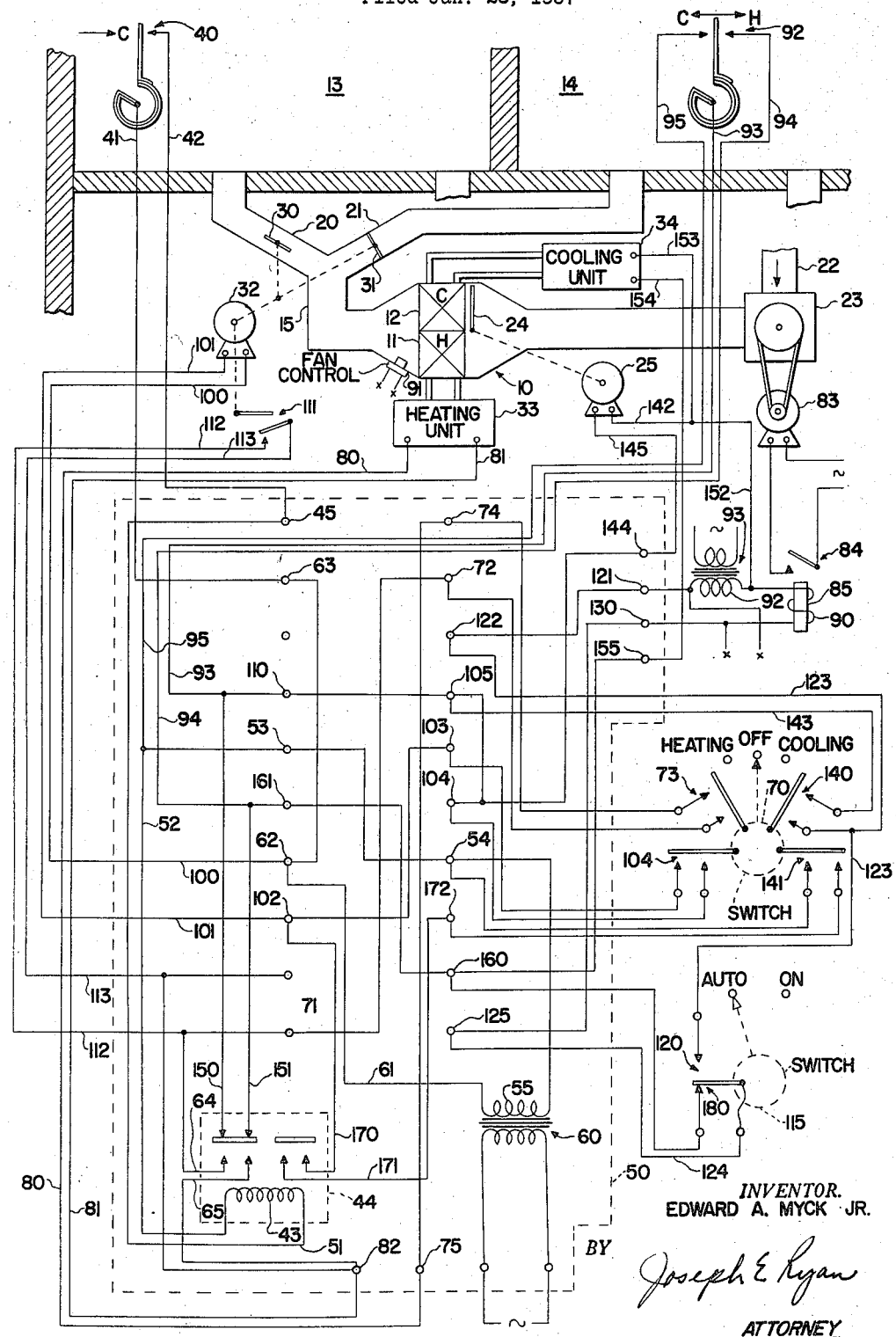

2,885,187

CONTROL APPARATUS

Edward A. Myck, Jr., Edina, Minn., assignor to Minneapolis-Honeywell Regulator Company, Minneapolis, Minn., a corporation of Delaware Application January 28, 1957, Serial No. 636,531

7 Claims. (Cl. 257—3)

The present invention is concerned with a control system in which the temperature is independently controlled in two spaces or zones for both heating and cooling, in particular, the system is adapted for an installation making use of a single damper motor controlling the flow of medium to the two spaces and a thermostat in each space for independently controlling the temperature.

The control of temperature independently in a plurality of spaces from a common furnace or cooling unit is quite common. Generally, it is done by having a flow control device associated with each space or zone for controlling the amount of heat or conditioning medium supplied to that space. Each flow control device is controlled by a temperature responsive device or thermostat in the respective space. The control of temperature independently in each space or "zone control" has been recognized in the heating and cooling industry as the accepted manner of maintaining comfort in a dwelling. It is obvious that such zone control requires more equipment and thus becomes more expensive than the conventional single thermostat system.

The present invention is concerned with a two zone control system for heating and cooling which requires only one damper motor. Such a system not only reduces the cost in that one less damper motor is used but the cost of installation and wiring is greatly reduced thus zone control for low cost housing is made available for both heating and cooling at a lower cost to the home owner.

Specifically, a single damper motor is used to control the flow of air from the heat exchanger to the two zones, one of which might be recognized as "the primary zone" and the other as "the secondary zone." When the secondary zone needs heat the damper motor is energized to cut off the flow of conditioning medium or air to the primary zone and increase the flow of air to the secondary zone. During heating heat is supplied to the heat exchanger under the control of the thermostat in the primary zone and the damper motor is controlled by the thermostat of the secondary zone. During cooling the cooling unit is controlled by both the primary and secondary zone thermostats; however, when the primary zone thermostat is satisfied it also controls the damper motor to cut down the flow of air to the primary zone and increase the flow of air to the secondary zone.

It is therefore an object of the present invention to provide an improved control system for controlling the temperature in a plurality of spaces.

Another object of the present invention is to provide an improved two zone control system wherein a single damper motor is used to control the flow of conditioning medium to the zones.

And still another object of the present invention is to provide a zone control system in which a single actuator is used to control the flow of conditioning medium to the zones so that the temperature in each zone can be independently controlled during heating and cooling.

These and other objects of the present invention will become apparent upon a study of the following specification of which a single figure is a schematice representation of the two space or zone conditioning system in which the temperature of the spaces are independently controlled during both heating and cooling.

A heat exchanger 10 having a heating coil 11 and a cooling coil 12 supplies conditioned air to spaces or zones 13 and 14 through a duct 15. Duct 15 is connected to spaces 13 and 14 through ducts 20 and 21, respectively. Air is returned from the spaces by a return duct 22 connected to a fan 23 which forces the air through heat exchanger 10.

A damper 24 driven by a motor 25 selectively covers either the cooling or the heating coil, the motor is deenergized and the damper is shown covering the cooling coil. A damper 30 and a damper 31 located in ducts 20 and 21, respectively, are connected to a motor 32. The dampers are so positioned, that as shown in the deenergized position, damper 30 is open and damper 31 is closed, thus air from heat exchanger 10 is directed into zone 13 which might be known as "the primary zone." Upon the energization of motor 32 the dampers are simultaneously moved so that the air to the primary zone is decreased and the air flow to zone 14 which might be known as "the secondary zone" is increased. The exact arrangement of these dampers might be selected to meet the needs of the particular installation. Often is it desirable upon energization of motor 32 to open damper 31, damper 30 will not close altogether. There will always be a small amount of air delivered to the primary zone.

A heating unit 33 of a conventional type is connected to the heating coil to increase its temperature when desired. A cooling unit 34 is connected to cooling coil 12.

A conventional thermostat 40 located in space 13 has a set of contacts for closing a circuit between conductors 41 and 42 when the temperature of space 13 drops below some predetermined selected value. Thermostat 40 is connected to an energization winding 43 of a relay 44 through a circuit traced as follows: conductor 42, a terminal 45 of a panel 50, a conductor 51, energization winding 43, a conductor 52, a terminal 53, a terminal 54, a secondary winding 55 of a transformer 60 whose primary is connected to a source of power, a conductor 61, a terminal 62, a terminal 63, and back to the thermostat through conductor 41. Thus upon the contacts of the thermostat in the primary zone closing, relay 44 is energized to close a circuit between the conductors 64 and 65 connected to a normally open pair of contacts of the relay.

Assuming that manual selector or selector switch 70 is rotated to the left to the heating position, the energization of relay 44 will bring about operation of the heating unit 33 through a circuit traced as follows: from conductor 64 to a terminal 71, a terminal 72, through the closed switch 73 of the selector 70, a terminal 74, a terminal 75, conductor 80 which is connected to the heating unit, conductor 81 returning from the heating unit, a terminal 82, and back to the relay through conductor 65. The heating unit might be of any conventional type which upon closing its input circuit initiates operation to supply heated medium to heating coil 11.

During the heating operation a motor 83 for driving fan 23 is connected to a source of power through a switch 84 which is closed upon energization of a relay 85. The relay has an energization winding 90 which is connected in series with a conventional fan control 91 and a secondary winding 92 of a transformer 93 having a primary connected to a source of power. Upon the temperature of the heat exchanger 10 increasing above some predetermined value when the heating coil 11 is supplied with heating medium by the heating unit, fan control 91 closes a circuit to energize relay 85 and thus initiate operation of the fan 23. As long as the heat exchanger 10 is above the predetermined setting of the fan control, the fan will remain running.

The secondary zone 14 has a thermostat 92 which has contacts for providing a closed circuit between a conductor 93 and a conductor 94 when the temperature of the zone exceeds some predetermined value and a set of contacts for providing a closed circuit between conductor 93 and a conductor 95 when the zone temperature drops below the aforementioned value. During heating upon a drop in the temperature of space 14 a closed circuit would be established between conductors 93 and 95 to initiate operation of damper motor or actuator 32 through a circuit traced as follows: from conductor 95 to terminal 53, terminal 54, a secondary 55 of the transformer 60, conductor 61, terminal 62, a conductor 100, motor 32, a conductor 101, a terminal 102, a terminal 103, a second switch 104 of the selector 70 which is closed when selector is in the heating position, a terminal 104, a terminal 105, a terminal 110, and back to the thermostat of zone 14 through conductor 93. Thus it is seen that even though primary zone 13 is calling for heat and the burner is energized it is possible when the secondary zone 14 desires heat that the damper motor will reposition the dampers 30 and 31 to bleed off some of the air flow to the primary zone and direct it into the secondary zone. If by chance the primary zone becomes satisfied and the secondary zone still needs heat to satisfy its thermostat an end switch 111, which is operated by damper motor 32 when it reaches its extreme position with damper 31 fully open, is provided to initiate operation of the burner. The end switch upon closing closes a circuit between conductor 112 and 113 to initiate energization of heating unit 33 even though relay 44 is de-energized through a circuit traced as follows: conductor 112, terminal 71, terminal 72, switch 73, terminal 74, terminal 75, conductor 80, heating unit 33, conductor 81, terminal 82, and back to the end switch through conductor 113.

A manual selector or switch 115 can be positioned in the "automatic" or "on" position to select the mode of operation of fan 23. Should continuous fan be desired during the heating operation selector 115 is rotated to the right to close switch 120 and thus establish continuous energization of relay 85 through a circuit traced as follows: from winding 90 of the relay, secondary 92, terminal 121, terminal 122, a conductor 123, switch 120, conductor 124, a terminal 125, a terminal 130, and back to the energization winding 90.

Upon a need for cooling, however it is determined, selector 70 is rotated to the extreme right, this opens switch 73 and switch 104. In the new position for selector 70 switches 140 and 141 are closed. Motor 25 is energized to reposition damper 124 in front of the heating coil so that air passing through the heat exchanger passes through cooling coil 12. The motor is energized through a circuit traced as follows: conductor 142, secondary 92, terminal 121, terminal 122, conductor 123, switch 140, conductor 143, a terminal 144, and back to the damper motor through a conductor 145.

The cooling unit 34 is controlled by thermostat 40 in the primary zone through relay 44 whenever it is de-energized thus the reverse action of the thermostat 40 is obtained. Upon de-energizing relay 44 a circuit is closed between a conductor 150 and a conductor 151. Cooling unit 34 is energized through a circuit traced as follows: from conductor 150, terminal 110, terminal 105, switch 140, terminal 122, terminal 121, secondary 92, a conductor 152, a conductor 153, a cooling unit 34, a conductor 154, a terminal 155, a terminal 160, a terminal 161, and back to conductor 151.

Thermostat 92 of the secondary zone also can control the cooling unit whenever there is a need for cooling in that zone. Thus upon a circuit being established between conductors 93 and 94 when the temperature of space 14 exceeds some predetermined value, the cooling unit 35 is energized through a circuit traced as follows: from conductor 93, terminal 110, terminal 105, switch 140, terminal 122, terminal 121, secondary 92, conductor 152, conductor 153, cooling unit 34, conductor 154, terminal 155, terminal 160, terminal 161, and back to conductor 94 of the thermostat 92. Since the dampers 30 and 31 are positioned as shown it is obvious that even though both thermostats 40 and 92 of the primary and secondary zones are calling for cooling only the primary zone will be cooled except it be for the leakage through duct 21 around damper 31. As soon as thermostat 40 is satisfied, damper motor 32 is energized to reposition dampers 30 and 31 so that the cooled air is directed into the secondary zone. Motor 32 is energized when the thermostat 40 is satisfied as it would close to establish a circuit between conductors 41 and 42 to energize relay 44. This would establish a circuit between conductors 170 and 171 to energize motor 32 through a circuit traced as follows: from conductor 170, terminal 102, conductor 101, motor 32, conductor 100, terminal 62, conductor 61, secondary 55, terminal 54, switch 141, a terminal 172, and back to conductor 171.

During the cooling operation the continuous fan operation can be obtained, as obtained when selector 115 was rotated to the extreme right position during heating. Upon rotation of selector 115 in the extreme left position intermittent operation of fan 23 is obtained each time cooling unit 34 is energized. This is accomplished through a circuit traced as follows: from the energization winding of the fan relay 85, secondary 92, terminal 121, terminal 122, conductor 123, switch 140, terminal 105, terminal 110, conductor 150, conductor 151, terminal 161, terminal 160, terminal 130, and back to the winding 85.

*Operation*

The conditioning system as shown is de-energized as selector 70 is in the off position. Upon a need for heating selector 70 is rotated to the left. With the selector 115 in the "automatic" position fan 23 would be operated by fan control 91. Upon a drop in temperature of the primary zone 13 thermostat 40 closes to energize relay 44 and thus initiate operation of heating unit 33. Heating unit 33 increases the temperature of coil 11 so that as the air passes through the coil into zone 13 the thermostat is satisfied. As shown damper 31 is closed and thus no air would be available to the secondary zone 14. Should the secondary zone 14 need heat and thermostat 91 close the circuit between conductor 93 and 95, motor 32 is energized to reposition dampers 30 and 31 thus a portion of the air passing through heat exchanger 10 is available to the secondary zone. The longer motor 32 was operated assuming that it was a slow operating motor, the more air would be directed to the secondary zone and a smaller amount of air would be available to the primary zone. By the proper design of the dampers, the primary zone would have preference so that under no possible condition would the damper motor 30 shut off all of the air to the primary zone.

Let us assume that the primary zone thermostat 40 became satisfied and de-energized relay 44. This would shut off heating unit 33. Should the secondary zone thermostat 92 still desire heat for that zone it would continue to energize motor 32 to open damper 31 and close damper 30. Upon reaching the extreme open position end switch 111 closes and this establishes an energization circuit for heating unit 33 so that even though the primary zone thermostat was satisfied the secondary zone could obtain heat.

Upon a need for cooling selector 70 is moved to the extreme right position and switch 140 is closed. Switches 73 and 104 are open to de-energize the heating unit.

Upon a need for cooling by the primary zone thermostat 40 it opens the circuit between conductors 41 and 42 to de-energize the relay 44 and establish energization of cooling unit 34 by the relay out contacts. As long as the primary zone needed cooling the dampers 30 and 31 are positioned as shown to direct cool air through the heat exchanger 10 into the primary zone. Damper 24 covers coil 11 so that air passing through the heat exchanger 10 passes through the cooling coil 12, this damper was repositioned when selector 70 was moved to the cooling position.

Should the secondary zone desire cooling and its thermostat 92 closes the circuit between conductors 93 and 94 and nothing happens this would only establish a second energization circuit for the cooling unit in parallel with thermostat 40. As soon as the thermostat 40 is satisfied it closes to energize relay 44. If it were not for the fact that thermostat 92 was calling for cooling the cooling unit would be de-energized. Upon de-energizing relay 44 motor 32 is energized to reposition dampers 30 and 31 so that the cool air from heat exchanger 10 is directed to the secondary zone 14. It is obvious that the primary zone 13 has preference and must be satisfied before cooling can be accomplished in the secondary zone.

With the selector 115 as shown automatic operation of the fan exists. Each time the cooling unit was energized regardless of whether it be under the control of thermostat 40 or thermostat 92, the fan is energized. If selector 115 is moved to the extreme right position for "on or continuous" fan operation, the fan 23 runs continuously in the cooling range regardless of whether the cooling unit is energized or not.

It is obvious that one particular embodiment of the present invention is shown as directed to a forced air heating and cooling application and it should be understood that the scope of the present invention should only be limited by the appended claims in which I claim:

1. In a two zone heating and cooling system, a heat exchanger, duct means connected to said heat exchanger to deliver conditioned air to said zones, air flow control means associated with said duct means, heating means, cooling means, said heating and cooling means being associated with said heat exchanger, manual changeover switch means having a first and second positions, first temperature responsive switch means associated with the first zone, second temperature responsive switch means associated with the second zone, circuit means including said changeover switch means when in said first position connecting said first switch means in a controlling relation to said heating means, second circuit means including said changeover switch means when in said first position for connecting said second switch means in a controlling relation to said air flow control means so that upon said second zone calling for heat said air flow control means can cut down the flow to the first zone and increase the flow to the second zone, further circuit means associated with said manual changeover switch means when in said second position for connecting said first temperature responsive means in a controlling relation to said cooling means, another circuit means including said changeover switch means when in said second position for connecting said second temperature responsive switch means in a controlling relation to said cooling means, and still another circuit means including said changeover switch means when in said second position for connecting said first temperature responsive means in a controlling relation to said air flow control means so that when said first temperature responsive means is satisfied said air flow control means cuts down the flow to said first zone and increases the flow to said second zone.

2. In a two zone heating and cooling system, a heat exchanger, duct means connected to said heat exchanger to deliver conditioned air to said zones, air flow control means associated with said duct means, first conditioning means, second conditioning means, said first and second conditioning means being associated with said heat exchanger, manual changeover switch means having a first and second positions, first temperature responsive switch means associated with the first zone, second temperature responsive switch means associated with the second zone, circuit means including said changeover switch means when in said first position connecting said first switch means in a controlling relation to said first conditioning means, second circuit means including said changeover switch means when in said first position for connecting said second switch means in a controlling relation to said air flow control means so that upon said second zone calling for conditioning said air flow control means can cut down the flow to the first zone and increase the flow to the second zone, further circuit means associated with said manual changeover switch means when in said second position for connecting said first temperature responsive means in a controlling relation to said second conditioning means, another circuit means including said changeover switch means when in said second position for connecting said second temperature responsive switch means in a controlling relation to said second conditioning means, and still another circuit means including said changeover switch means when in said second position for connecting said first temperature responsive means in a controlling relation to said air flow control means so that when said first temperature responsive means is satisfied said air flow control means cuts down the flow to said first zone and increases the flow to said second zone.

3. In a control system for controlling the individual temperature in two spaces from a common heat exchanger to which heating and cooling devices are connected, conduit means for connecting the heat exchanger in a manner to deliver conditioned medium to the spaces, flow control means associated with said conduit means for either decreasing the flow to a first of the spaces and increasing the flow to a second of the spaces or decreasing the flow of the second space and increasing the flow to the first space, changeover switch means, first temperature responsive switch means associated with the first space, second temperature responsive switch means associated with the second space, circuit means including said changeover switch means when in a first position for connecting said first responsive switch means in a manner to control the operation of the heating device, circuit means including said changeover switch means when in said first position for connecting said second temperature responsive switch means in a manner to control said flow control means so that upon a need for heat in the second space the flow of conditioned medium to the second space is increased, circuit means including said changeover switch means when in a second position for connecting said first temperature responsive switch means in a manner to control the cooling device, circuit means including said changeover switch means when in said second position for connecting said first temperature responsive means in a manner to control said flow control means to decrease the flow of conditioned medium to the first space when said first temperature responsive switch means is satisfied, and circuit means including said changeover switch means for connecting said second temperature responsive switch means in a manner to control the cooling device.

4. In a control system for controlling the individual temperature in two spaces from a common heat exchanger, to which heating and cooling devices are connected, conduit means for connecting the heat exchanger in a manner to deliver conditioned medium to the spaces, flow control device associated with said conduit means for either decreasing down the flow to a first of the spaces and increasing the flow to a second of the spaces or decreasing the flow of the second space and increasing the flow to the first space, changeover switch means, first temperature responsive switch means associated with the first space, second temperature responsive switch means associated with the second space, circuit means including said changeover switch means when in a first position for connecting said first responsive switch means in a manner to control the operation of one of the devices, circuit means including said changeover switch means when in said first position for connecting said second temperature responsive switch means in a manner to control another of the devices, circuit means including said changeover switch means when in a second position for connecting said first temperature responsive switch means in a manner to control one of the devices, circuit means including said changeover switch means when in said second position for connecting said first temperature responsive means in a manner to control one of the devices, and circuit means including said changeover switch means for connecting said second temperature responsive switch means in a manner to control one of the devices.

5. In a control system for controlling the output of a heat exchanger furnishing conditioned medium selectively through a flow control device to two spaces, the heat exchanger having a cooling device and a heating device associated therewith, a first and second temperature responsive means responsive the temperature of a first and a second of the spaces, respectively, a heating or a cooling selector means, means including said selector means when in the heating position adapted to connect said first responsive means to control the heating device, means including said selector means when in a heating position adapted to connect said second responsive means in a manner to control the flow control device to increase the flow of conditioned medium to the second space when said second responsive means is not satisfied, means including said selector means when in a cooling position adapted to connect said first and second responsive means in a manner to control the cooling device, and means including said selector means when in said cooling position adapted to connect said first responsive means to the flow control device so that when said first responsive means is satisfied the flow of conditioned medium to the second space is increased.

6. In a temperature control system for controlling the temperature in two zones independently, a first and a second temperature responsive means associated with the zones, a first and a second temperature changing means, a flow control means, conduit means including said flow control means for connecting said first and second changing means to said zones, selector means having a first and second positions, means including said selector when in said first position for connecting said first temperature responsive means in a controlling relation to said first changing means, means including said selector when in said first position for connecting said second temperature responsive means in a controlling relation to said flow control means, means including said selector means when in a second position for connecting said first and second temperature responsive means in a controlling relation to said second changing means, and means including said selector means when in said second position for connecting said first temperature responsive means in a controlling relation to said flow control means.

7. In a temperature control system for controlling the temperature of two spaces independently, first, second and third control means, first and second temperature responsive means responsive to their space temperatures, selector means having a first and a second position, means including said selector means when in said first position for connecting said first responsive means in a controlling relation to said first control means, means including said selector means when in said first position for connecting said second responsive means in a controlling relation to said second control means, means including said selector means when in said second position for connecting said first and second responsive means in a controlling relation to said third control means, and means including said selector means when in a second position for connecting said first responsive means in a controlling relation to second control means.

References Cited in the file of this patent

UNITED STATES PATENTS

| | | |
|---|---|---|
| 2,177,597 | Haines | Oct. 24, 1939 |
| 2,196,687 | Steinfeld | Apr. 9, 1940 |
| 2,269,036 | Nessell | Jan. 6, 1942 |